US006967317B2

(12) United States Patent
Atmur

(10) Patent No.: US 6,967,317 B2
(45) Date of Patent: Nov. 22, 2005

(54) SYSTEMS AND METHODS FOR TIME SLICING A FOCAL PLANE TO COMPENSATE FOR DIM TARGETS IN AN OPTICAL TRACKING SYSTEM

(75) Inventor: Robert J. Atmur, Whittier, CA (US)

(73) Assignee: The Boeing Company, Chicago, IL (US)

( * ) Notice: Subject to any disclaimer, the term of this patent is extended or adjusted under 35 U.S.C. 154(b) by 153 days.

(21) Appl. No.: 10/635,188

(22) Filed: Aug. 6, 2003

(65) Prior Publication Data

US 2005/0029430 A1 Feb. 10, 2005

(51) Int. Cl.$^7$ .............................................. H01L 27/00
(52) U.S. Cl. ................... 250/208.1; 348/296
(58) Field of Search .................. 250/208.1; 348/303, 348/310, 315, 296–298

(56) References Cited

U.S. PATENT DOCUMENTS

| | | | |
|---|---|---|---|
| 5,327,234 A | 7/1994 | Creswick | |
| 5,812,190 A | 9/1998 | Audier et al. | |
| 5,949,483 A | 9/1999 | Fossum et al. | |
| 6,606,121 B1 * | 8/2003 | Bohm et al. | 348/297 |
| 6,831,688 B2 * | 12/2004 | Lareau et al. | 348/272 |
| 6,831,689 B2 * | 12/2004 | Yadid-Pecht | 348/297 |

OTHER PUBLICATIONS

Elliott P. Berg, Peng Xiao, Ioan Nothingher, Robert E. Imhof, Hans Zogg; *Fast Focal Plane Array Detector and Readout for Pulsed Opto-Thermal Radiometry*; Analytical Sciences, Apr. 2001, pps. 5465-5468, vol. 17 Special Issue 2001.

Robert C. Lewis, Jr., Christopher R. Neyman; *Characterization of the AEOS Adaptive Optics System*; Publications of the Astronomical Society of the Pacific, 114; Nov. 2002; pp. 1260-1266; The Astronomical Society of the Pacific; USA.

Paul J. Berger, Daniel V. Murphy, John R. Kenemuth, Michael L. Vigil, David Witte, Rene Abreu, David R. Dean, Charles D. Delp, Michael E. Meline, William M. Rappoport, William P. Zmek, Robert C. Allen, David A. Hansen, Sarma N. Gullapalli, Michael F. Marchionna, Louis S. Mendyk, Christopher J. Musial, Conrad Neufeld, Ralph Pringle, Andrea M. Sarnik, William J. Swanson, Mark Ealey, Thomas R. Price, David Briscoe; *AEOS Adaptive-Optics System and Visible Imager*; 19 pages; Available at <http://www.maui.afmc.af.mil/AMOS/1999_AMOSTechnicalConference/Berger_paper/B . . . >; (visited Jul. 7, 2003).

* cited by examiner

Primary Examiner—David Porta
Assistant Examiner—Patrick J. Lee
(74) Attorney, Agent, or Firm—Alston & Bird LLP

(57) ABSTRACT

A system and method are provided for controlling an optical imaging system capable of providing an image of a target. The system includes a focal plane array and a tracker controller. The focal plane array can receive light from the optical imaging system. At least a portion of the focal plane array can then be capable of integrating light for a selectable integration time, and thereafter reading out data representative of the integrated light for a readout time. At least a portion of the focal plane array is capable of integrating light and reading out data such that the integration time is capable of increasing at a rate higher than a rate of decrease in a frame rate of the focal plane array. The tracker controller, in turn, can control the integration time of the focal plane array based upon an intensity of light received by the focal plane array.

25 Claims, 9 Drawing Sheets

SYSTEMS AND METHODS FOR TIME SLICING A FOCAL PLANE TO COMPENSATE FOR DIM TARGETS IN AN OPTICAL TRACKING SYSTEM

FIELD OF THE INVENTION

The present invention relates generally to optical tracking systems and methods and, more particularly, relates to systems and methods for compensating for dim targets in an optical tracking system.

BACKGROUND OF THE INVENTION

Telescopes used in many industries comprise large, sophisticated computer-controlled instruments with full digital outputs. And whereas telescopes have evolved over time, designers have paid particular attention to telescope parameters, including the light-collecting power of the telescope (as a function of the diameter of the telescope) and the angular resolution (as measured by image sharpness). For a perfect telescope operated in a vacuum, resolution is directly proportional to the inverse of the telescope diameter. In this regard, the perfect telescope generally converts a plane wavefront from distant star (effectively at infinity) into a perfectly spherical wavefront, thus forming the image with an angular resolution only limited by light diffraction.

In practice, however, errors such as atmospheric and telescope errors distort the spherical wavefront, creating phase errors in the image-forming ray paths. Generally, the cause of such atmospheric distortion is random spatial and temporal wavefront perturbations induced by turbulence in various layers of the atmosphere. Image quality can also be affected by permanent manufacturing errors and by long time scale-wavefront aberrations introduced by mechanical, thermal, and optical effects in the telescope, such as defocusing, decentering, or mirror deformations generated by their supporting devices.

In light of the errors introduced into such telescope systems, mechanical improvements have been made to minimize telescope errors. As a result of requirements for many large telescopes, typically those with primary mirrors above one meter, a technique known as adaptive optics was developed for medium or large telescopes, with image quality optimized automatically by means of constant adjustments by in-built corrective optical elements. In this regard, telescope systems operating according to the adaptive optics technique generally include an adaptive optics assembly that comprises a deformable mirror that is optically coupled to the telescope behind the focus of the telescope at or near an image of the pupil. The deformable mirror, which includes a number of actuators for essentially changing the shape of the mirror, is controlled to apply wavefront correction to images received by the telescope.

In addition to the adaptive optics assembly, such telescope systems also generally include a tracking system. Whereas such conventional tracking systems are adequate in tracking objects imaged by the telescope system, such tracking systems have drawbacks. As will be appreciated, the effectiveness of the closed-loop control of the tracking system in tracking the movement of the object is generally limited by the rate at which a tracking device, such as a tracking charge-coupled device (CCD) focal plane, can record an image received from the telescope system.

Because of the limit of the imaging device, some movement of the object, or residual jitter, of the object between each image taken by the focal plane array can escape the tracking system and cause degradation of images taken by the adaptive optics assembly. And as objects being tracked emit or reflect a decreasing amount of light, thus reducing the intensity of light received from the object, the ability of the tracking system to compensate for residual jitter decreases. In this regard, the time required for the tracking device to collect enough photons of light to exceed the dark-cell current of the focal plane to thereby adequately image the object increases as the object becomes dimmer. And as the time required for the tracking device to image the object increases, the ability of the tracking system to compensate for residual jitter decreases.

SUMMARY OF THE INVENTION

In light of the foregoing background, embodiments of the present invention provide an improved optical tracking system and method for controlling an optical imaging system, such as a telescope, capable of providing an image of a target. Advantageously, the optical tracking system and method of embodiments of the present invention are capable of compensating for objects being tracked that emit or reflect a decreasing amount of light such that the system operates with a substantially constant amount of residual jitter. More particularly, embodiments of the present invention are capable of controlling the integration time of a tracking device such that the tracking device can collect enough photons to effectively image the target. Advantageously, embodiments of the present invention are capable of controlling the integration time without altering, or without significantly altering, the frame rate of the tracking device. By controlling the intensity of light received by the tracking device, the integration time of the tracking device can be controlled such that the tracking device can collect photons of light from the target at a rate sufficient to compensate for at least a portion of the residual jitter, while maintaining, or substantially maintaining, the bandwidth of the system.

According to one aspect of the present invention, a system is provided for controlling an optical imaging system capable of providing an image of a target. The system includes a focal plane array and a tracker controller. The focal plane array may comprise a plurality of sub-arrays, each of which may comprise a plurality of fractions. The focal plane array is capable of receiving light from the optical imaging system. At least a portion of the focal plane array can then be capable of integrating light for a selectable integration time, and thereafter reading out data representative of the integrated light for a readout time. More particularly, at least one group including at least a portion of each sub-array, such as at least one group of fractions including one or more fractions of each sub-array, can be capable of integrating light and thereafter reading out data. The tracker controller is capable of controlling the integration time of the focal plane array based upon an intensity of light received by the focal plane array. For example, the tracker controller can be capable of increasing the integration time of the tracking device when the intensity of light received by the focal plane array decreases.

Advantageously, at least a portion of the focal plane array is capable of integrating light and reading out data such that the integration time is capable of increasing at a rate higher than a rate of decrease in a frame rate of the focal plane array. For example, when the integration time is no greater than the product of the read out time and the number of groups of fractions integrating light and reading out data, the integration time of each group is capable of increasing while the frame rate of the focal plane array remains constant. And when the integration time is greater than the product of the read out time and the number, N, of groups of fractions integrating light and reading out data, the frame rate can increase at a rate equal to 1/N times the rate of increase of the integration time of each group of fractions.

More particularly, the focal plane array can include a plurality of sub-arrays, where one or more groups including at least a portion of each sub-array is capable of integrating light and reading out data such that the integration time of each group is capable of increasing at a rate higher than a rate of decrease in the frame rate of the focal plane array. When each group includes one or more fractions of each sub-array, each group fractions can be capable of integrating light and reading out data such that the integration time of the group is capable of increasing at a rate higher than a rate of decrease in the frame rate of the tracking device.

To operate the focal plane array such that the integration time can increase at a rate greater than the rate of decrease in the frame rate of the focal plane array, the groups of fractions can be capable of starting the integration of light in succession. More particularly, the groups of fractions can be capable of starting the integration of light in succession such that each group of fractions is capable of starting the integration of light at a time offset from the start of integration of a previous group of fractions by at least the readout time and less than the integration time. The groups of fractions can also be capable of starting the reading out of data in succession such that each group of fractions starts reading out of data after a previous group of fractions finishes reading out data. During continuous operation, then, the groups of fractions are capable of repeatedly integrating light and reading out data such that the group including a first fraction of each sub-array is capable of reading out data from a subsequent integration of light after the group including a last fraction of each sub-array read out data from a current integration of light.

An improved tracking device and method of controlling an optical imaging system capable of providing an image of a target are also provided.

BRIEF DESCRIPTION OF THE DRAWINGS

Figure 1:
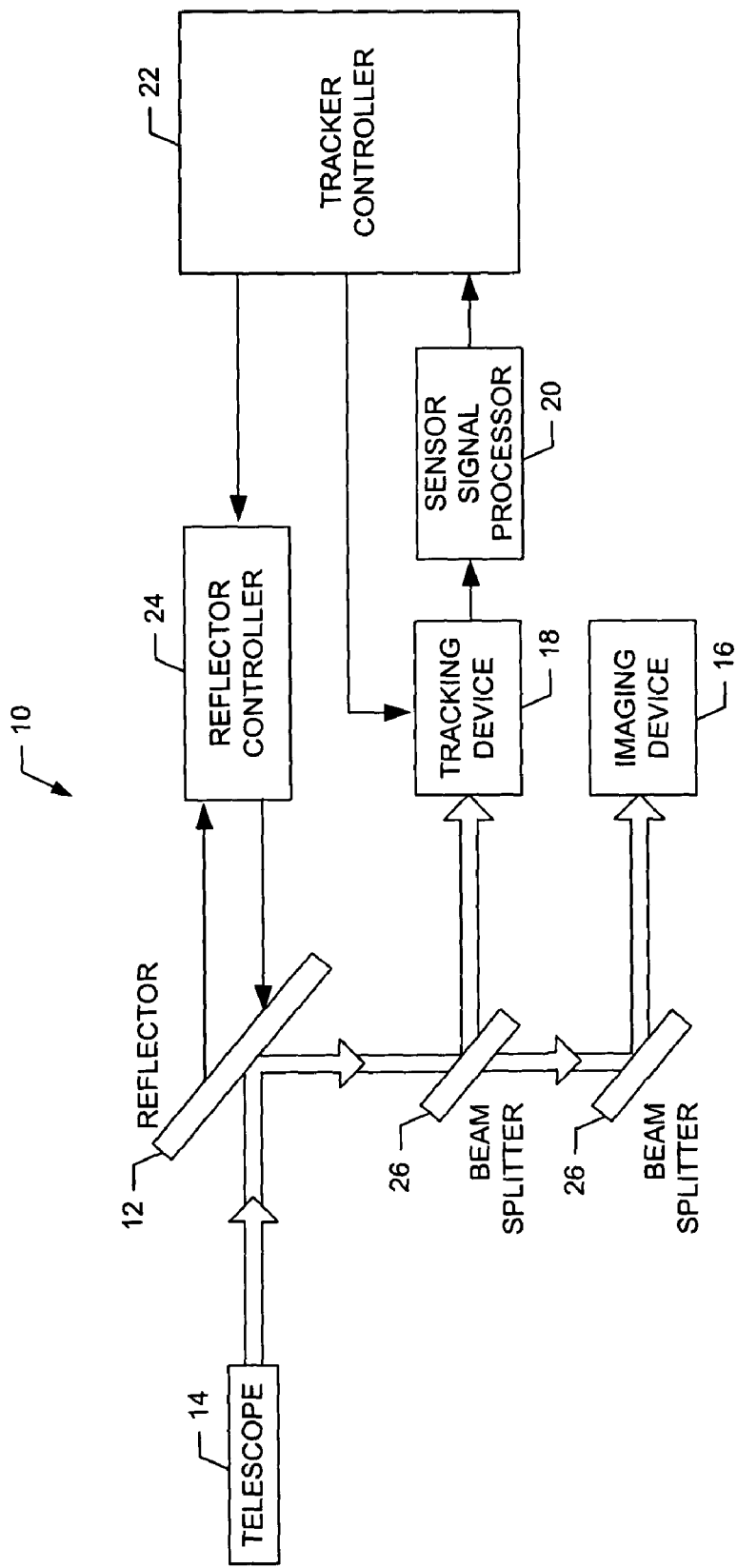
Figure 2:
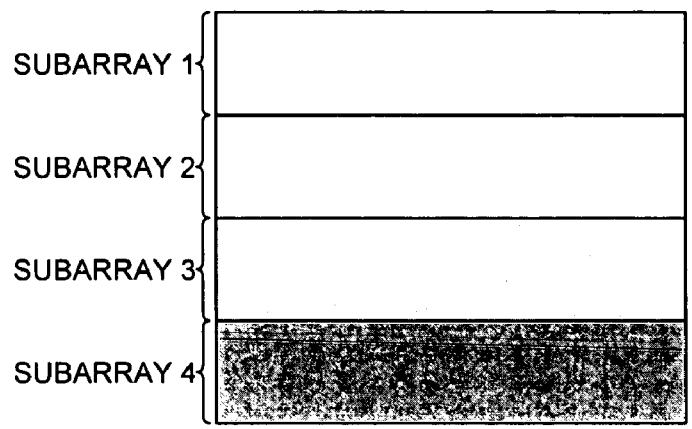
Figure 3A:
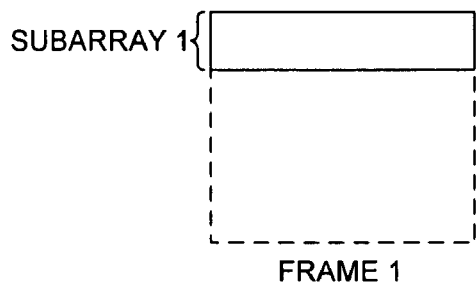
Figure 3B:
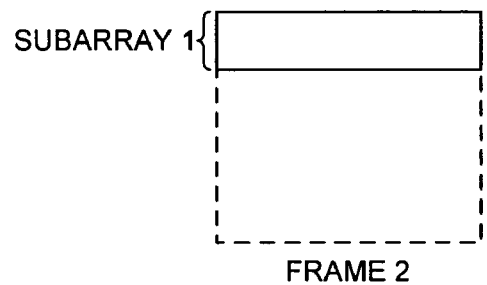
Figure 3C:
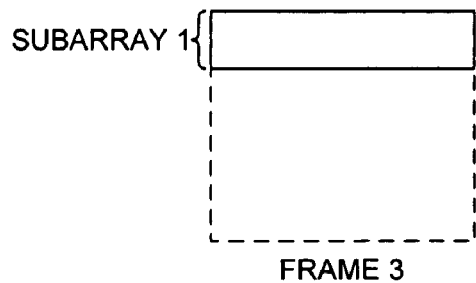
Figure 3D:
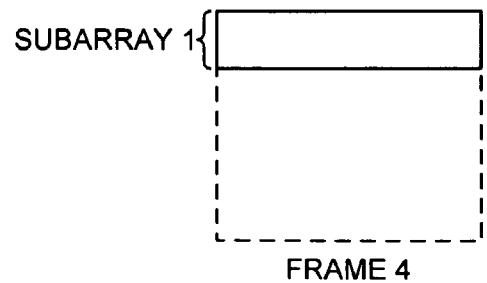
Figure 4A:
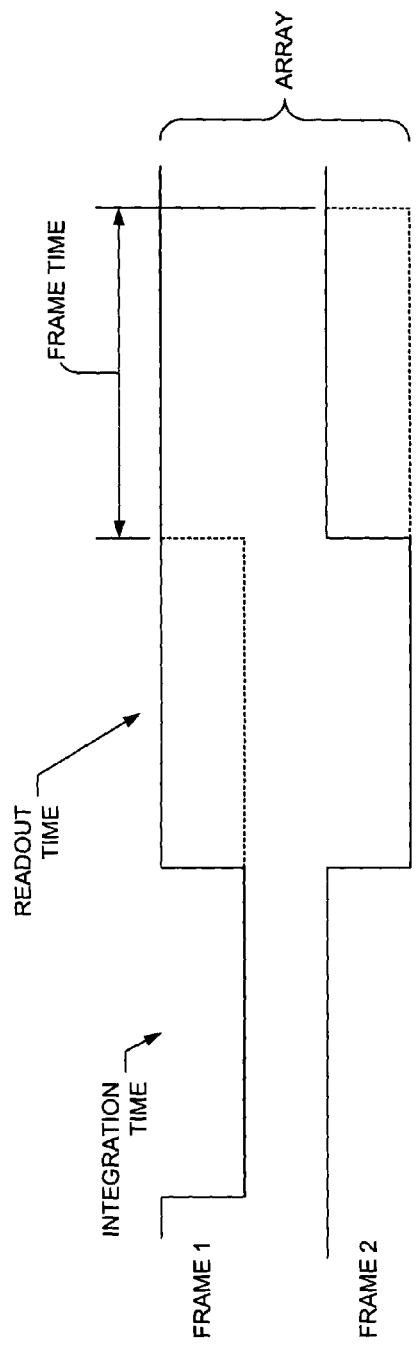
Figure 4B:
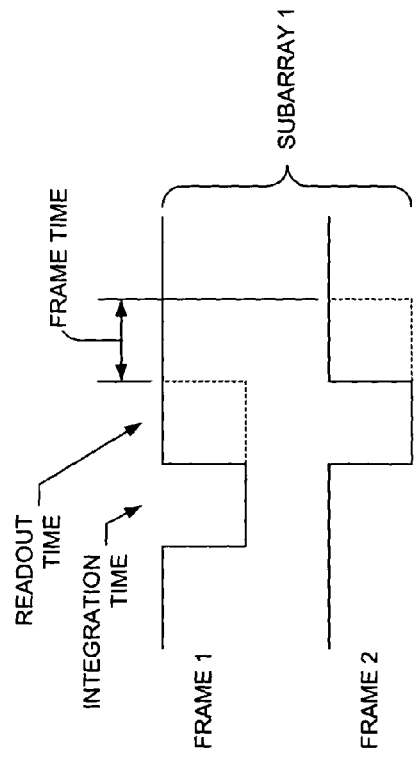
Figure 5:
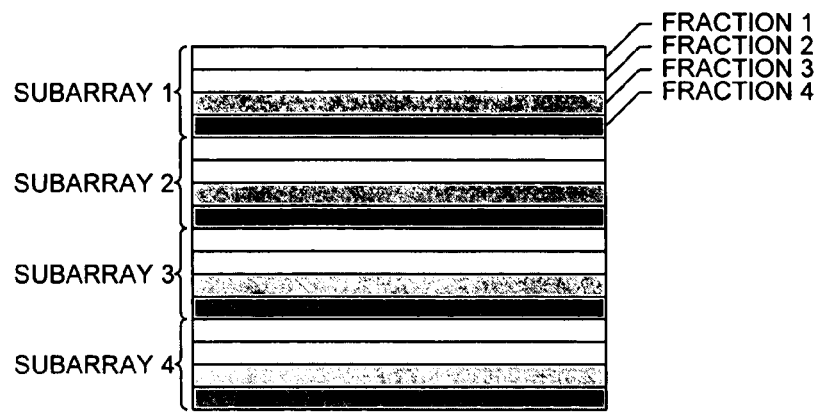
Figure 6A:
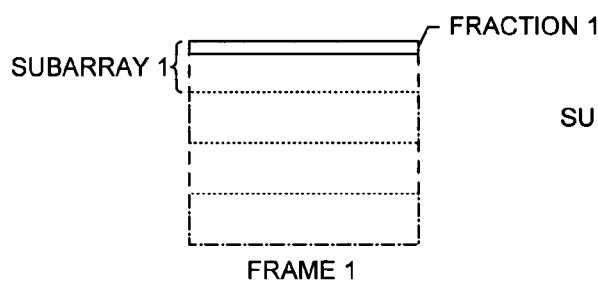
Figure 6B:
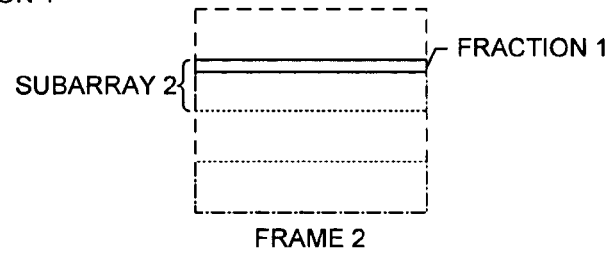
Figure 6C:
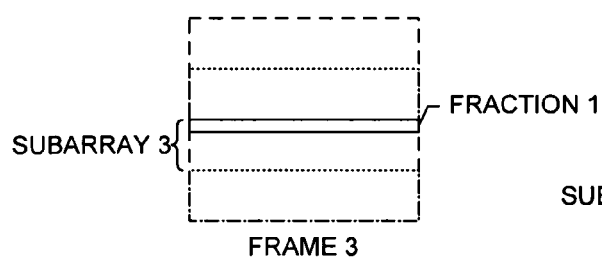
Figure 6D:
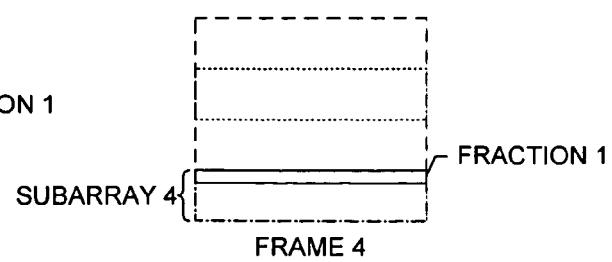
Figure 7:
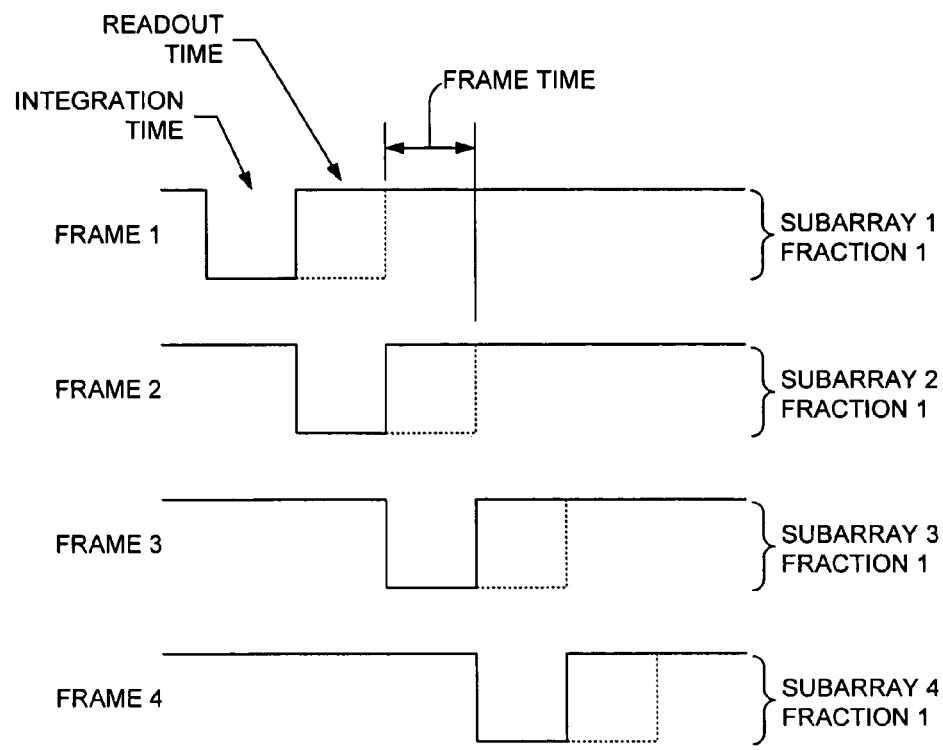
Figure 8A:
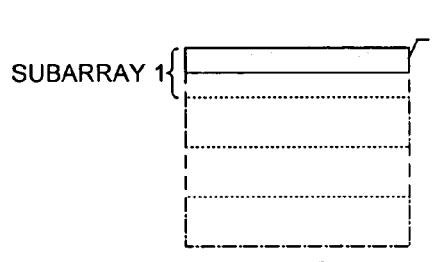
Figure 8B:
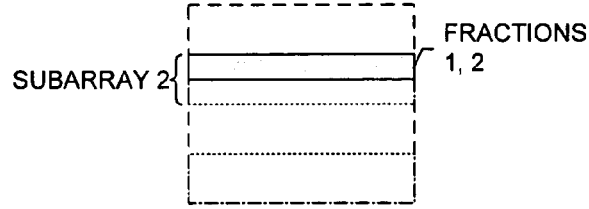
Figure 8C:
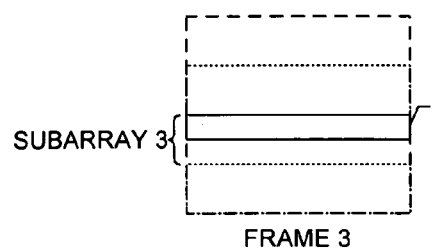
Figure 8D:
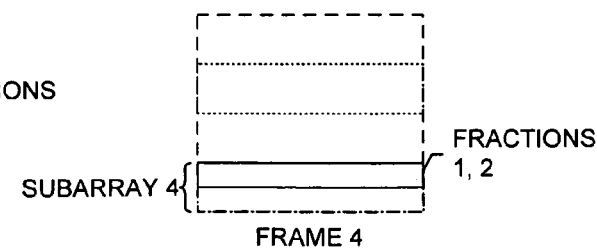
Figure 9:
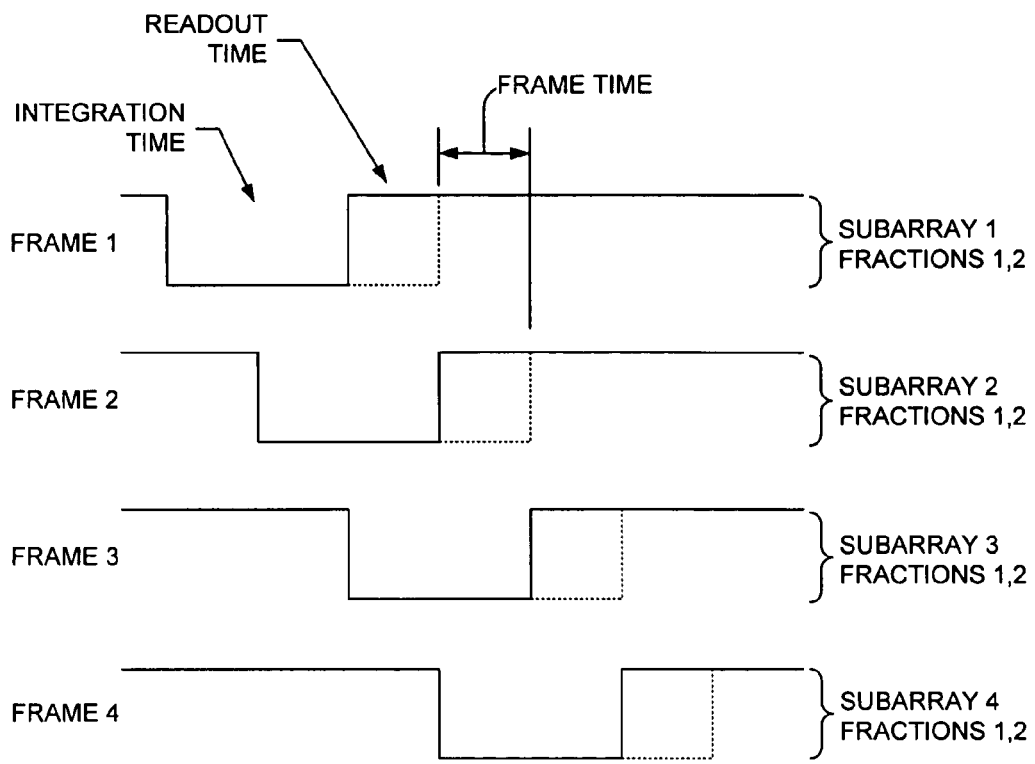
Figure 10A:
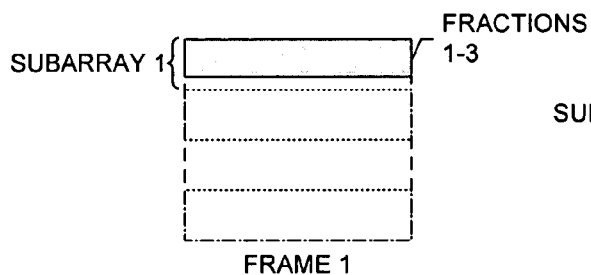
Figure 10B:
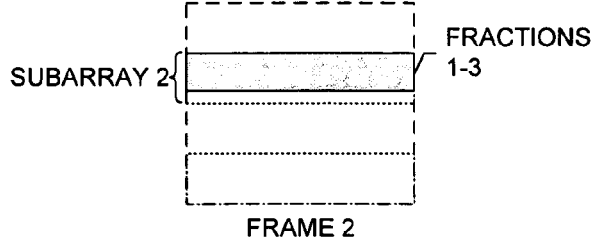
Figure 10C:
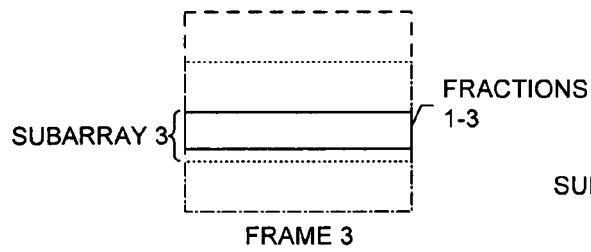
Figure 10D:
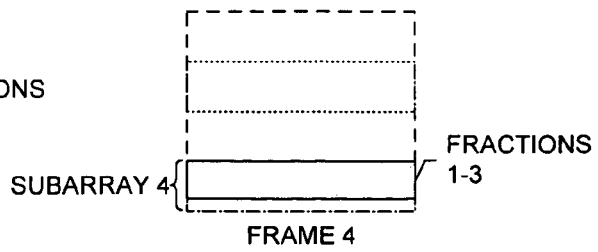
Figure 11:
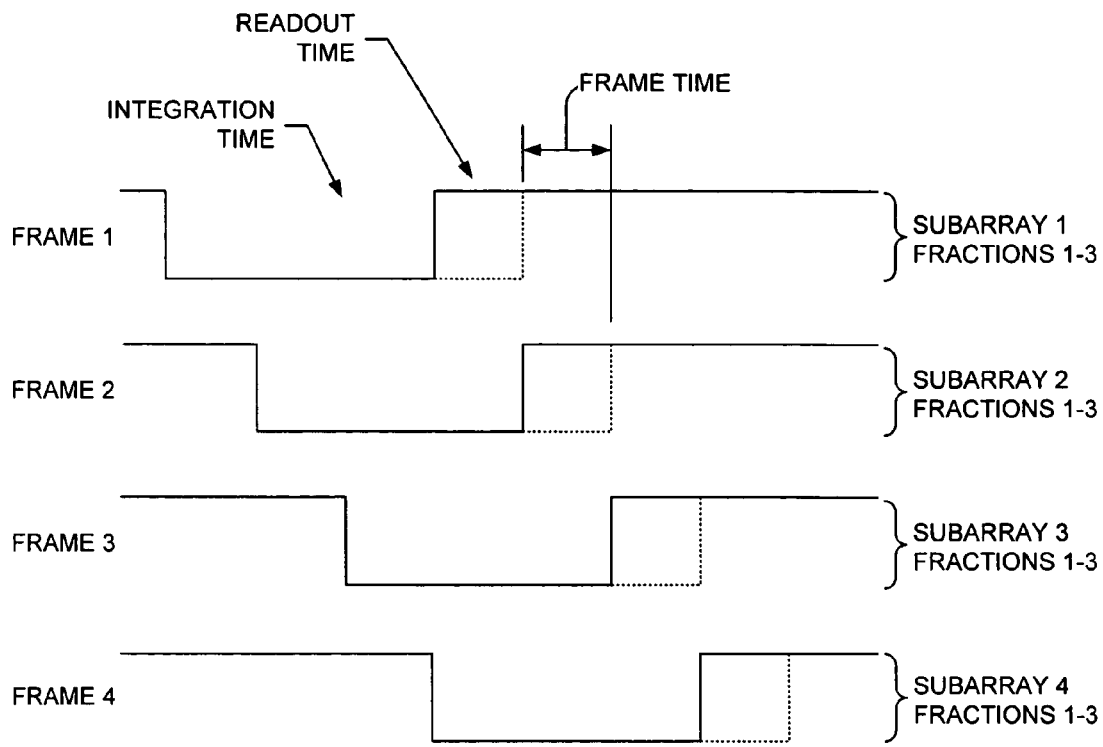
Figure 12A:
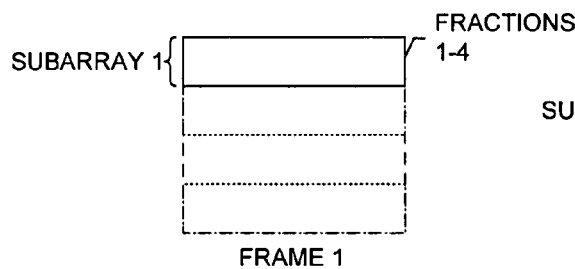
Figure 12B:
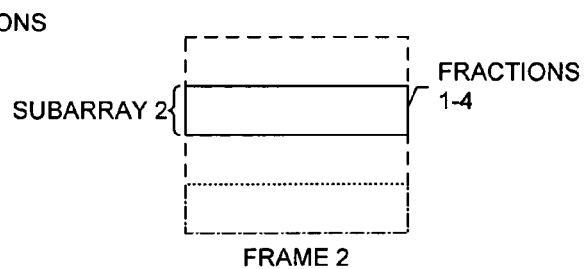
Figure 12C:
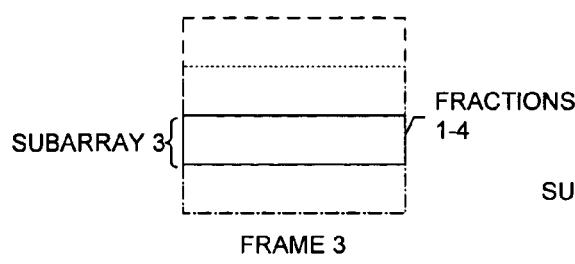
Figure 12D:
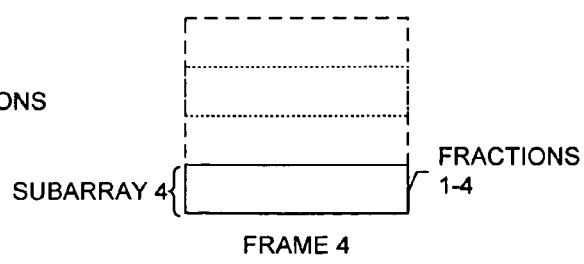
Figure 13:
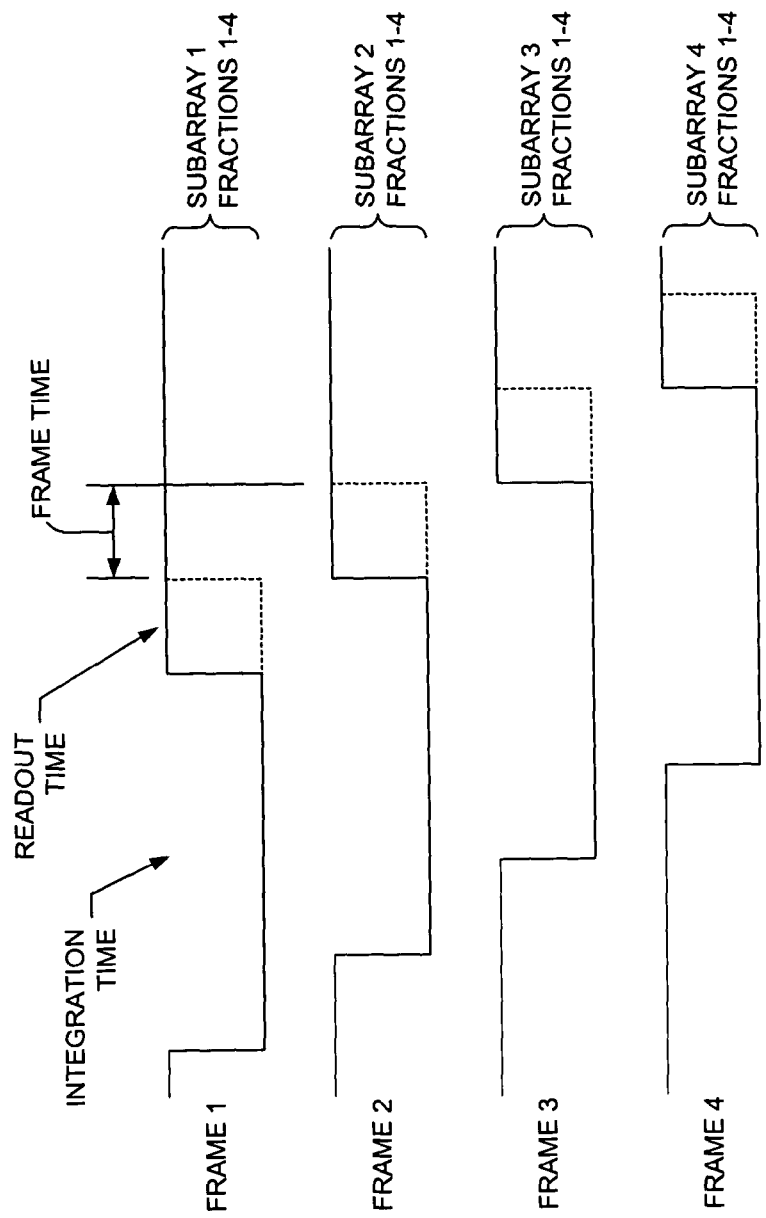
Figure 14:
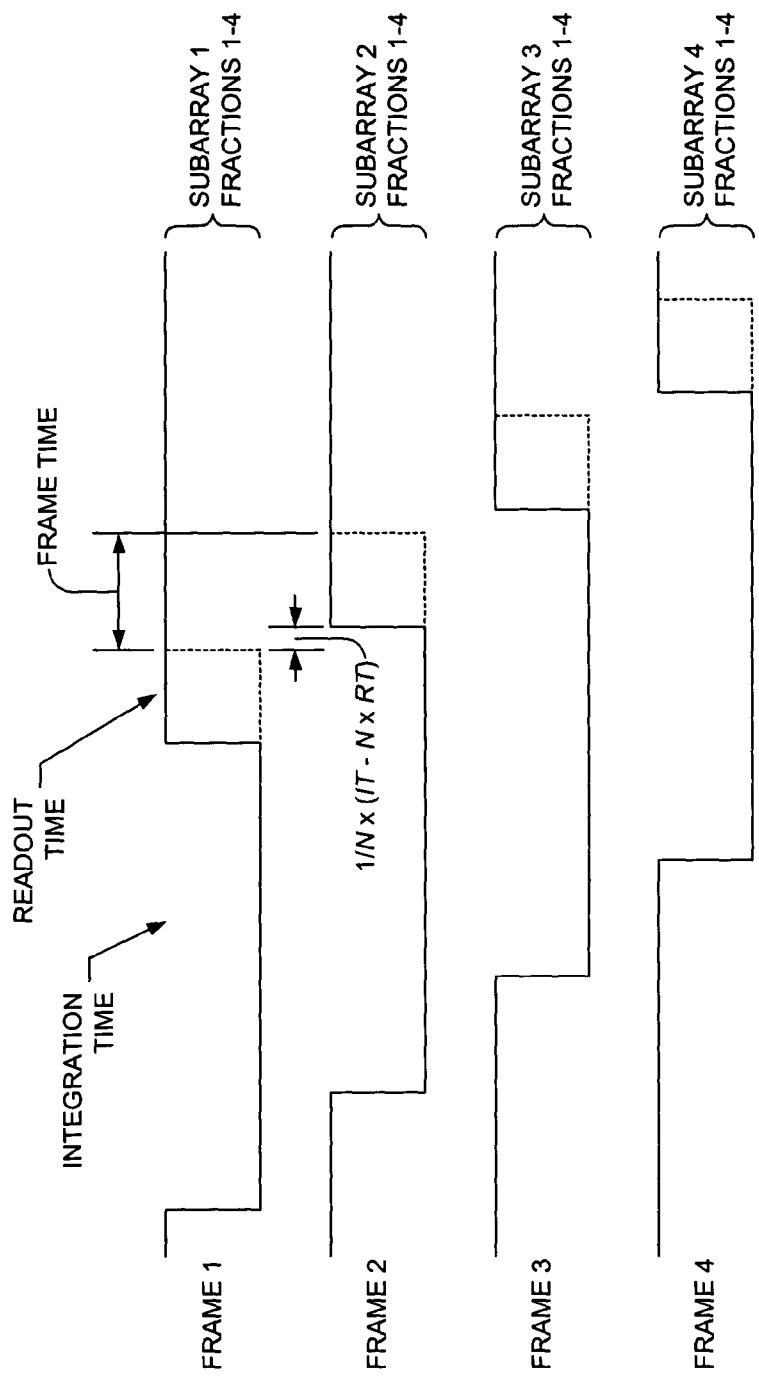

Having thus described the invention in general terms, reference will now be made to the accompanying drawings, which are not necessarily drawn to scale, and wherein:

FIG. 1 is a schematic block diagram of a tracking system for an optical imaging system, such as an adaptive optics telescope system, according to one embodiment of the present invention;

FIG. 2 is a schematic block diagram of a conventional focal plane array tracking device including four sub-arrays;

FIGS. 3A–3D are schematic block diagrams illustrating four successive frames integrated/read out for one sub-frame of the focal plane array of FIG. 2;

FIG. 4A is a timing diagram illustrating the integration time, readout time and frame time for two successive frames from the focal plane array of FIG. 2, with all sub-arrays integrated/read out;

FIG. 4B is a timing diagram illustrating the integration time, readout time and frame time for two successive frames from the focal plane array of FIG. 2, with only the first sub-array integrated/read out, as shown in FIGS. 3A–3D;

FIG. 5 is a schematic block diagram of a focal plane array tracking device including four sub-arrays, each including four fractions, according to one embodiment of the present invention;

FIGS. 6A–6D are schematic block diagrams illustrating four successive frames integrated/read out for one fraction of the sub-frames of the focal plane array of FIG. 5, according to one embodiment of the present invention;

FIG. 7 is a timing diagram illustrating the integration time, readout time and frame time according to one embodiment of the present invention for four successive frames from the focal plane array of FIG. 5, with only the first fraction of the sub-arrays integrated/read out, as shown in FIGS. 6A–6D;

FIGS. 8A–8D are schematic block diagrams illustrating four successive frames integrated/read out for two fractions of the sub-frames of the focal plane array of FIG. 5, according to one embodiment of the present invention;

FIG. 9 is a timing diagram illustrating the integration time, readout time and frame time according to one embodiment of the present invention for four successive frames from the focal plane array of FIG. 5, with the first two fractions of the sub-arrays integrated/read out, as shown in FIGS. 8A–8D;

FIGS. 10A–10D are schematic block diagrams illustrating four successive frames integrated/read out for three fractions of the sub-frames of the focal plane array of FIG. 5, according to one embodiment of the present invention;

FIG. 11 is a timing diagram illustrating the integration time, readout time and frame time according to one embodiment of the present invention for four successive frames from the focal plane array of FIG. 5, with the first three fractions of the sub-arrays integrated/read out, as shown in FIGS. 10A–10D;

FIGS. 12A–12D are schematic block diagrams illustrating four successive frames integrated/read out for all four fractions of the sub-frames of the focal plane array of FIG. 5, according to one embodiment of the present invention;

FIG. 13 is a timing diagram illustrating the integration time, readout time and frame time according to one embodiment of the present invention for four successive frames from the focal plane array of FIG. 5, with all four fractions of the sub-arrays integrated/read out, as shown in FIGS. 12A–12D; and FIG. 14 is a timing diagram illustrating the integration time, readout time and frame time according to one embodiment of the present invention for four successive frames from the focal plane array of FIG. 5, with all four fractions of the sub-arrays integrated/read out with an integration time greater than the product of the read out time and the number of sub-frames of the focal plane array.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Reference is now drawn to FIG. 1, which illustrates a block diagram of a tracking system 10 for an optical assembly, such as an adaptive optics assembly, as such are known. As shown, the tracking system includes a reflector 12, such as a fast steering mirror, that is capable of repeatedly reflecting light representative of images of a target, such as a star, received by a telescope 14, which typically includes the adaptive optics assembly comprising, among other elements, primary, secondary and tertiary mirrors. In this regard, the reflector reflects the light representative of the images while applying phase tilt adjustments to the images. In turn, the light reflected by the reflector is recorded by an imaging device 16, such as a focal plane array or charge-coupled device (CCD) focal plane, following an analog-to-digital conversion process.

The light representative of the image of a target, which is reflected by the reflector 12, can also be recorded by a tracking device 18, such as another focal plane array or CCD focal plane. Thereafter, the light from the tracking device can be processed by a sensor signal processor 20, which repeatedly determines the center location of the image on a reference plane. The image center location is then fed into a tracker controller 22. And from the image center location, the tracker controller can repeatedly determine a position of the reflector relative to both an X axis and Y axis, such as according to known integral control. The tracker controller, in turn, can pass reflector position drive signals for both the X axis and the Y axis to a reflector controller 24, which drives the reflector to the determined position.

As will be appreciated, the reflector 12, telescope 14, imaging device 16, sensor signal processor 20, tracker controller 22 and reflector controller 24 can be made from conventional elements and collectively comprise any of a number of known optical tracking systems. For example, the reflector, telescope, imaging device, sensor signal processor, tracker controller and reflector controller can comprise elements of the Advanced Electro-Optical System (AEOS) telescope system, as such is well known to those skilled in the art. As will also be appreciated, the system 10 can include one or more optical elements such as mirrors, prisms, beam splitters 26 or the like for controlling the light received from the reflector and/or the telescope.

As stated in the background, conventional tracking systems are limited in effectiveness by the rate at which the tracking device can update the image received from the fast steering mirror. Because of the limit of the imaging device, some movement of the object, or residual jitter, of the object between each image taken by the focal plane array can escape the tracking system and cause degradation of images taken by the adaptive optics assembly. In this regard, the effectiveness of conventional tracking systems to compensate for residual jitter is limited by the time required for the imaging device to collect enough photons of light to exceed the dark-cell current of the focal plane of the tracking device, which is directly proportional to the intensity of light received by the telescope from the target.

As well known to those skilled in the art, a conventional focal plane array (FPA), as such may operate as a tracking device, comprises a set of CCD wells that are repeatedly either filled or depleted by incoming light for periods of time called the "integration time." In other terms, a conventional FPA integrates light for an integration time required to collect enough light to provide a detectable signal (change) in the CCD wells. In addition to the integration time, the CCD wells also require an amount of time to read out the values integrated in each well. The sum of the integration time and the readout time, then, can be considered the duration of each frame, or the frame time. And as will be appreciated, the frame rate (i.e., number of frames that can be processed per second) is typically set by the frame time. As will also be appreciated, it is typical of conventional FPAs to overlap integration of one frame with the readout of a previous frame to thereby shorten the frame time.

In conventional FPAs, following integration of a frame, the acquired data is shifted into a readout array and the CCD wells are reset such that integration of a new frame can begin. In this regard, the integration time for each frame must be at least as long as the readout time for the respective frame. As such, in one conventional system utilizing a conventional FPA, the FPA is broken into a number of sub-arrays such that the FPA may be operated to only repeatedly integrate/readout one or more of the sub-arrays to reduce the readout time (read fewer well values). For example, as shown in FIG. 2, a FPA may be broken down into four sub-arrays, with each sub-array comprising a quarter of the entire FPA. Then, if the entire array is repeatedly integrated/read out, the frame time can be determined as shown in FIG. 4A.

To reduce the readout time, the FPA maybe operated such that only a portion of the array, or a number of sub-arrays, are integrated/read out. For example, the FPA of FIG. 2 maybe operated such that only three sub-arrays are repeatedly integrated/readout to decrease the readout time of each frame by a quarter of the readout time of the entire array. Similarly, the FPA may be operated to repeatedly integrate/readout two sub-arrays to decrease the readout time of each frame by one half of the readout time of the entire. Also, as shown in FIGS. 3A–3D for four frames, the FPA of FIG. 2 may be operated such that only the first sub-array is repeatedly integrated/read out. As shown in FIG. 4B for the frames of FIGS. 3A and 3B, then, by reducing the readout time, the integration time and frame time can be reduced, thus increasing the frame rate.

As also well known to those skilled in the art, because reducing the integration time reduces the time allowed for the CCD wells of the FPA to collect enough light to provide a detectable signal (change), integrating/reading out less than the entire FPA is typically only advantageous when the target emits or reflects a significant amount of light (i.e., when the target is very bright). As such, sub-framing a FPA is conventionally only used to reduce the integration time of the FPA and provide a higher frame rate. In this regard, such a technique does not provide an advantage for targets that emit or reflect a decreased amount of light (i.e., when the target is dim), because such objects require an integration time greater than the readout time for each frame. In conventional systems, however, the frame time increases directly with integration time. More particularly, in conventional systems, the frame time equals the integration time, where the highest possible frame rate is achieved when the integration time equals the product of the readout time and the number of sub-arrays integrated/read out.

Advantageous embodiments of the present invention are therefore capable of operating the tracking device 18 comprising a FPA by breaking up the FPA into sub-arrays, each of which is broken into a number of fractions. As shown in FIG. 5, for example, the tracking device may comprise a FPA broken down into four sub-arrays, with each sub-array further broken down into four fractions. Although as described herein, the FPA may include four sub-arrays, each of which includes four fractions, it should be understood that the FPA may include any number of sub-arrays, and that each sub-array may include any number of fractions, without departing from the spirit and scope of the present invention. Also, although as shown the FPA is broken down into sub-arrays and fractions that comprise lines, it should be understood that the FPA may be broken down into sub-arrays and fractions in any of a number of different manners, without departing from the spirit and scope of the present invention. For example, the FPA may be broken down such that the sub-arrays and/or the fractions comprise mosaics. In one advantageous embodiment, the shape of the sub-arrays and/or fractions can be selected based upon the target such that at least a portion of the target is imaged in each frame, as described below.

By operating the tracking device 18 to include a number of sub-arrays that each include a number of fractions, integration and readout of the sub-arrays can be arranged such that both the integration and readout periods overlap between frames. In turn, by overlapping the integration and readout periods, the integration time can increase as the target emits or reflects a decreasing amount of light, with the frame time increasing at a rate less than the rate of increase of the integration time. As such, the integration time can increase without significantly decreasing the frame rate. This allows the bandwidth of the system 10 to be maintained for dim targets, thereby providing improved performance over conventional systems.

More particularly, by operating the tracking device 18 to include a number of sub-arrays, with each sub-array including a number of fractions, one or more groups including one or more fractions of each sub-array may begin the integration of light in succession, with each frame consisting of the readout from a respective group of fractions. To allow the system 10 to increase the integration time at a rate higher than a rate of increase of the frame time, the integration period for each group of fractions is advantageously offset from the previous group by at least the readout time of each group, and typically no more than the integration time of each group. Advantageously, to facilitate processing the readouts from the groups of fractions of the sub-arrays integrated/read out, the system can account for the lack of readouts from the fractions in each sub-array not integrated/readout. In this regard, the system can use a calibration (dead pixel) map for one or more of the sub-arrays to generate default readouts for those fractions of the sub-arrays not integrated/read out for each frame.

The integration period for each group of fractions may be offset from the previous group of fractions by the readout time of each group when the integration period for each group is less than or equal to the collective readout time for all groups of fractions. In this regard, when the integration period for each group is less than or equal to the collective readout time for all groups of fractions, the integration time for each group may increase while the frame time (and, by extension, the frame rate) remains constant. Because data latency between frames always increases, however, when the integration period for each group of fractions is greater than the collective readout time for all groups, the frame time increases (and, by extension, the frame rate decreases) at a rate equal to the inverse of the number of groups of fractions in the FPA. For example, for a FPA with N groups of fractions, the relationship between frame time (FT) and integration time (IT) can be expressed based upon the readout time (RT) as follows:

$FT=RT$, if $IT \leq (N \times RT)$, otherwise $FT=RT+1/N \times (IT-N \times RT)$ From the above, then, when the integration time is less than or equal to the product of the number of groups of fractions and the readout time, the frame time, and thus the frame rate, does not increase as the integration time increases (i.e., $dFT=0 \times dIT$). And when the integration time is greater than the product of the number of sub-arrays and the readout time, the frame time, and by extension the frame rate, increases at a rate of 1/N times the rate of increase of the integration time (i.e., $dFT=1/N \times dIT$). In contrast to the imaging device of embodiments of the present invention, the frame time in a conventional FPA increases at the same rate as the increase in integration time, irrespective of the number of sub-arrays in a conventional FPA.

In operation, the tracking system 10 is capable of tracking a target, such as in accordance with any technique known to those skilled in the art. As the system tracks the target, however, the tracker controller 22 is capable of repeatedly receiving measurements of the intensity of light received by the tracking device 18 as the tracking device receives light representative of an image of the target. The tracker controller can receive the measurements from any of a number of different sources capable of measuring the intensity of light received by the tracking device, such as from any of a number of different sensors (not shown) located proximate the input, or at the input, of the tracking device.

As the tracker controller 22 receives measurements of the intensity of light representative of images of the target, the tracker controller can determine the integration time required for the tracking device to collect enough photons of light to exceed the dark-cell current of the tracking device 18 to thereby adequately image the target. The tracker controller can thereafter alter the integration time of the tracking device such that the integration time is at least as long as the time required to adequately image the target. In this regard, as the target emits or reflects a decreasing amount of light, the tracker controller can increase the integration time of the tracking device. Conversely, as the target emits or reflects an increasing amount of light, the tracker controller can, but need not, decrease the integration time of the tracking device.

As shown in FIGS. 6A–6D and 7 for four frames of data from a tracking device 18 including four sub-arrays of four fractions each, when the target emits or reflects a significant amount of light, the tracking device can be operated such that only a group of fractions including the first fraction of each sub-array is integrated/read out for each frame. In comparison, when the target emits or reflects such an amount of light, a conventional FPA in a conventional tracking system, such as that illustrated in FIG. 2, may be operated to only integrate/read out the entire first sub-array (see FIGS. 3A–3D). As can be seen from a comparison of FIGS. 4B and 7, by operating the tracking device to only integrate/read out the group of fractions including the first fraction of each sub-array, the tracking device can be operated with an integration time and frame time that equal the integration time and frame time of operating the conventional FPA of FIG. 2 to integrate/read out the entire first sub-array.

As the target emits or reflects a decreasing amount of light, the tracker controller 22 may determine to double, triple or even quadruple the integration time of the tracking device 18. In this regard, when the integration time is doubled, the tracking device may be operated such that the group of fractions including the first fraction in each sub-array, as well as a group of fractions including the second fraction in each sub-array, are integrated/read out, as shown in FIGS. 8A–8D and 9 for four frames of data from the tracking device. When the integration time is tripled, the tracking device may be operated such that the group of fractions including the first fraction of each sub-array, the group of fractions including the second fraction of each sub-array, and a group of fractions including the third fraction of each sub-array, are integrated/read out, as shown in FIGS. 10A–10D and 11. Similarly, when the integration time is quadrupled, the tracking device may be operated with all of the previous groups of fractions, as well as a group of fractions including the fourth fraction of each sub array, integrated/read out, as shown in FIGS. 12A–12D and 13.

As can be seen in FIG. 9, the system 10, or more particularly the tracker controller 22, of embodiments of the present invention can operate the tracking device 18 to integrate/read out from groups of fractions including the first and second fractions of each sub-array in instances in which a conventional FPA (see FIG. 2) with sub-arrays may be operated to integrate/read out the entire first two sub-arrays. Also, as shown in FIG. 11, the system can operate the tracking device to integrate/read out from groups of fractions including the first, second and third fractions in each sub-array in instances in which a conventional FPA may integrate/read out the entire first three sub-arrays. And as shown in FIG. 13, the system can operate the tracking device to integrate/read out from groups of fractions including all four fractions in each sub-array in instances in which a conventional FPA may integrate/read out the entire FPA (all sub-arrays). In contrast to the conventional FPA, however, in each instance, the tracking device of embodiments of the present invention can be operated with a frame time equal to that of a conventional FPA that only integrates/reads out the first sub-array, but with an integration time greater than that of a conventional FPA that integrates/reads out the first sub-array (see FIG. 4B).

If the tracker controller 22 determines to more than quadruple the integration time, however, the frame time increases, and thus the frame rate, decreases, as data latency between frames always increases and as the fractions of the first group of fractions cannot read out data from a subsequent integration period until the fractions of the last group of fractions have read out data from a previous integration period. As shown in FIG. 14, for example, to spread the data latency between all of the groups of fractions, each group of fractions begins an integration period offset from the integration period of the fractions of an immediately preceding group by the following:

RT+1/N×(IT−N×RT)

as indicated above. Thus, the frame time of the tracking device 18 can be considered equal to the readout time of a sub-array plus 1/N×(IT−N×RT), as shown in FIG. 14.

As shown and described herein, as the integration time required to adequately image the target increases, the number of groups of fractions integrated/read out of the tracking device 18 increases. It should be understood, however, that the number of groups of fractions integrated/read out need not increase with the required integration time. The integration time can be doubled, tripled quadrupled or increased beyond four times the original integration time without increasing the number of groups of fractions integrated/read out. As such, the timing diagrams shown in FIGS. 9, 11, 13 and 14, can equally apply to integrating/reading out only one group of fractions, such as a group of fractions including the first fraction of each sub-array. More generally, then, the number of groups of fractions integrated/read out need not be increased to increase the integration time. In this regard, the number of groups of fractions integrated/read out can be increased or decreased in any of a number of different circumstances, such as to better image the target based upon the amount of data read out from each sub-array.

As also shown and described herein, the integration time can be increased in multiples of an original integration time equal to the read out time of each group of fractions. It should also be understood that the integration time need not be increased in integer multiples of the original integration time. Alternatively, depending upon the integration time required to adequately image the target, the integration time can be increased by any amount, including by a fraction, integer or mixed integer multiple of the original integration time. It should further be understood that although the tracker controller 22 has been described herein as increasing the integration time as the time required to adequately image the target increases due to the target emitting or reflecting decreasing amounts of light, the tracker controller can similarly decrease the integration time. For example, if the target emits or reflects an increasing amount of light, the tracker controller can determine to decrease the integration time in a manner similar to the reverse of increasing the integration time described above.

By controlling the integration time of the tracking device 18, the tracker controller 22 can control the amount of time the tracking device collects photons to adequately image the target, while maintaining the frame rate or at least decreasing the frame rate at a rate less than the increase in integration time. The tracking device can thereafter record an image represented by the light received from the target. Advantageously, by increasing the integration time of the tracking device, the tracking device can collect the photons of light for a sufficient period of time at a substantially constant rate. As such, the tracking system 10 is capable of operating with reduced residual jitter, particularly when the target emits or reflects a decreased amount of light.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for controlling an optical imaging system capable of providing an image of a target, the system comprising:
    a focal plane array capable of receiving light from the optical imaging system, wherein at least a portion of the focal plane array is capable of integrating light for a selectable integration time and thereafter reading out data representative of the integrated light for a readout time, and wherein at least a portion of the focal plane array is capable of integrating light and reading out data such that the integration time is capable of increasing at a rate higher than a rate of decrease in a frame rate of the focal plane array; and
    a tracker controller capable of controlling the integration time of the focal plane array based upon an intensity of the light received by the focal plane array.

2. A system according to claim 1, wherein the tracker controller is capable of increasing the integration time of the tracking device when the intensity of light received by the focal plane array decreases.

3. A system according to claim 1, wherein the focal plane array comprises a plurality of sub-arrays, wherein at least one group including at least a portion of each sub-array is capable of integrating light and reading out data such that the integration time of each group is capable of increasing at a rate higher than a rate of decrease in the frame rate of the focal plane array.

4. A system according to claim 3, wherein each sub-array of the focal plane array comprises a plurality of fractions, and wherein at least one group including at least one fraction of each sub-array is capable of integrating light and reading out data such that the integration time of each group of fractions is capable of increasing at a rate higher than a rate of decrease in the frame rate of the tracking device.

5. A system according to claim 4, wherein the groups of fractions are capable of starting the integration of light in succession such that each group of fractions is capable of starting the integration of light at a time offset from the start of integration of a previous group of fractions by at least the readout time and less than the integration time.

6. A system according to claim 5, wherein the groups of fractions are capable of starting the reading out of data in succession such that each group of fractions start reading out data after a previous group of fractions finishes reading out data.

7. A system according to claim 6, wherein the groups of fractions are capable of repeatedly integrating light and reading out data such that the group including a first fraction of each sub-array is capable of reading out data from a subsequent integration of light after the group including a last fraction of each sub-array read out data from a current integration of light.

8. A system according to claim 3, wherein the integration time of each group of fractions is capable of increasing while the frame rate of the focal plane array remains constant when the integration time is no greater than the product of the read out time and the number of groups of fractions integrating light and reading out data.

9. A system according to claim 3, wherein the frame rate is capable of increasing at a rate equal to 1/N times the rate of increase of the integration time of each group of fractions when the integration time is greater than the product of the read out time and the number, N, of groups of fractions integrating light and reading out data.

10. A method for controlling an optical imaging system comprising:
  reflecting light provided by the optical imaging system;
  recording data representative of the reflected light, wherein the light is recorded by a focal plane array comprising a plurality of sub-arrays, and wherein recording the light comprises:
    integrating, by at least one group including at least a portion of each sub-array, at least a portion of the light for a selectable integration time; and
    reading out data representative of the integrated portion of the light, wherein at least a portion of the light is integrated and the data read out such that the integration time of each group is capable of increasing at a rate higher than a rate of decrease in a frame rate of the focal plane array; and
  driving a reflector to a position in at least one direction based upon the recorded data representative of the light.

11. A method according to claim 10 further comprising: measuring an intensity of the reflected light, and thereafter selecting the integration time based upon the intensity of light.

12. A method according to claim 11 further comprising: increasing the integration time when the intensity of the light decreases.

13. A method according to claim 10, wherein each sub-array of the focal plane array comprises a plurality of fractions, and wherein integrating at least a portion of the light comprises integrating, by at least one group including at least one fraction of each sub-array, at least a portion of the light, and reading out data such that the integration time of each group of fractions is capable of increasing at a rate higher than a rate of decrease in the frame rate of the tracking device.

14. A method according to claim 13, wherein integrating at least a portion of the light comprises integrating at least a portion of the light by the groups of fractions in succession such that the integration by each group of fractions starts at a time offset from the start of integration by a previous group of fractions by at least the readout time and less than the integration time.

15. A method according to claim 14, wherein reading out data representative of the integrated portion of light comprises reading out data by the groups of fractions in succession such that each group of fractions starts reading out data after a previous group of fractions finishes reading out data.

16. A method according to claim 15, wherein integrating at least a portion of the light and reading out data comprise repeatedly integrating at least a portion of the light and reading out data such that the group including a first fraction of each sub-array read out data from a subsequent integration of light after the group including a last fraction of each sub-array read out data from a current integration of light.

17. A method according to claim 10 further comprising:
  increasing the integration time of each group, wherein the frame rate of the focal plane array remains constant as the integration time increases when the integration time is no greater than the product of the read out time and the number of groups of fractions integrating at least a portion of the light and reading out data.

18. A method according to claim 10 further comprising:
  increasing the integration time of each group of fractions, wherein the frame rate increases as the integration time increases when the integration time is greater than the product of the read out time and the number, N, of groups of fractions integrating at least a portion of the light and reading out data, and wherein the frame rate increases at a rate equal to 1/N times the rate of increase of the integration time.

19. A tracking device capable of receiving light from an optical imaging system, wherein the tracking device comprises:
  a focal plane array comprising a plurality of sub-arrays, wherein at least one group including at least a portion of each sub-array is capable of integrating light for a selectable integration time and thereafter reading out data representative of the integrated light for a readout time, and wherein the at least one group is capable of integrating light and reading out data such that the integration time of each group is capable of increasing at a rate higher than a rate of decrease in a frame rate of the focal plane array.

20. A tracking device according to claim 19, wherein each sub-array of the focal plane array comprises a plurality of fractions, and wherein at least one group including at least one fraction of each sub-array is capable of integrating light and reading out data such that the integration time of each group of fractions is capable of increasing at a rate higher than a rate of decrease in the frame rate of the focal plane array.

21. A tracking device according to claim 20, wherein the groups of fractions are capable of starting the integration of light in succession, and wherein each group of fractions is capable of starting the integration of light at a time offset from the start of integration of a previous group of fractions by at least the readout time and less than the integration time.

22. A tracking device according to claim 21, wherein each group of fractions is capable of starting the reading out of data after a previous group of fractions finishes reading out data.

23. A tracking device according to claim 22, wherein the groups of fractions are capable of repeatedly integrating light and reading out data, and wherein the group including a first fraction of each sub-array is capable of reading out data from a subsequent integration of light after the group including a last fraction of each sub-array read out data from a current integration of light.

24. A tracking device according to claim 19, wherein the integration time of each group of fractions is capable of increasing while the frame rate of the focal plane array remains constant when the integration time is no greater than the product of the read out time and the number of groups of fractions integrating light and reading out data.

25. A tracking device according to claim 19, wherein the frame rate is capable of increasing at a rate equal to 1/N times the rate of increase of the integration time of each group of fractions when the integration time is greater than the product of the read out time and the number, N, of groups of fractions integrating light and reading out data.

* * * * *